(12) United States Patent
Esteghlal

(10) Patent No.: US 11,764,680 B2
(45) Date of Patent: Sep. 19, 2023

(54) CONTROL DEVICE FOR A DC-DC CONVERTER AND METHOD FOR THE CLOSED-LOOP CONTROL OF A DC-DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/763,486

(22) PCT Filed: Aug. 20, 2020

(86) PCT No.: PCT/EP2020/073274
§ 371 (c)(1),
(2) Date: Mar. 24, 2022

(87) PCT Pub. No.: WO2021/058204
PCT Pub. Date: Apr. 1, 2021

(65) Prior Publication Data
US 2022/0345036 A1 Oct. 27, 2022

(30) Foreign Application Priority Data
Sep. 24, 2019 (DE) .............. 10 2019 214 586.8

(51) Int. Cl.
*H02M 3/158* (2006.01)
*H02M 1/00* (2006.01)
(52) U.S. Cl.
CPC ....... *H02M 3/1584* (2013.01); *H02M 1/0016* (2021.05); *H02M 1/0025* (2021.05)
(58) Field of Classification Search
CPC .. H02M 3/1584; H02M 3/158; H02M 1/0016; H02M 1/0019; H02M 1/0022; H02M 1/0025
See application file for complete search history.

(56) References Cited

U.S. PATENT DOCUMENTS

2009/0248177 A1\* 10/2009 Rifai ................. G05B 13/02
700/45
2015/0263609 A1\* 9/2015 Weida ................. H02M 3/156
323/234
(Continued)

FOREIGN PATENT DOCUMENTS

DE 102016219740 A1 4/2018
DE 102019213071 A1 3/2021
EP 2919374 A1 9/2015

OTHER PUBLICATIONS

Translation of International Search Report for Application No. PCT/EP2020/073274 dated Nov. 13, 2020 (2 pages).

*Primary Examiner* — Alex Torres-Rivera
(74) *Attorney, Agent, or Firm* — Michael Best & Friedrich LLP

(57) ABSTRACT

The invention relates to enhanced adjusting of the control variables for a DC-DC converter comprising multiple DC-DC converter modules (30-1, 30-2). For this purpose, alongside the conventional controlling of the individual DC-DC converter modules, an additional correction variable (K-1, K-2) is determined which can be added to the control variable (R4-1, R4-2). In particular, the correction variable can take into account individual properties of the DC-DC converter modules, such as component tolerances or similar. For this purpose, correction values suitable for the individual DC-DC converter modules can be determined in advance and stored in a non-volatile storage means. Using these previously stored links, the control variables for the individual DC-DC converter modules can be individually adjusted.

10 Claims, 3 Drawing Sheets

(56) References Cited

U.S. PATENT DOCUMENTS

| | | | |
|---|---|---|---|
| 2018/0212457 A1* | 7/2018 | Haefele | H02M 3/285 |
| 2019/0052169 A1* | 2/2019 | Bhandarkar | H02M 1/4225 |
| 2021/0119537 A1* | 4/2021 | Nakabayashi | H02M 1/0025 |

* cited by examiner

CONTROL DEVICE FOR A DC-DC CONVERTER AND METHOD FOR THE CLOSED-LOOP CONTROL OF A DC-DC CONVERTER

BACKGROUND OF THE INVENTION

The present invention relates to a control device for a DC-DC converter, in particular a DC-DC converter having a plurality of DC-DC converter modules, and a method for the closed-loop control of a DC-DC converter.

Document DE 10 2016 219 740 A1 discloses a DC-DC converter comprising a plurality of DC-DC converter modules connected in parallel. In this case, a common voltage regulator is provided for all of the DC-DC converter modules. Furthermore, separate current regulation is provided for each DC-DC converter module.

DC-DC converters are intended for converting a DC input voltage into a DC output voltage, wherein the voltage level of the DC input voltage can differ from the voltage level of the DC output voltage. The maximum output power of a DC-DC converter is limited corresponding to the dimensions of the components used. In order to increase the output power, if appropriate a plurality of DC-DC converter modules can be connected in parallel. In order to subject the individual DC-DC converter modules to as uniform a load as possible, the individual DC-DC converter modules can be made equal, i.e. the DC-DC converter modules are driven in such a way that they each produce an at least approximately equal output current.

Document DE 10 2019 213 071 A1 describes a possible method for equating a plurality of DC-DC converter modules in a DC voltage arrangement.

SUMMARY OF THE INVENTION

The present invention discloses a control device for a DC-DC converter and a method for the closed-loop control of a DC-DC converter.

Accordingly, the following is provided:

A control device for a DC-DC converter comprising a plurality of DC-DC converter modules. The control device comprises a control unit and a compensation unit. The control unit is designed to provide an individual controlled variable for each DC-DC converter module. The individual controlled variable of each DC-DC converter module is determined using a setpoint variable for the output voltage, a present value for the output voltage, a present value for the input voltage and a present value for the respective current in a DC-DC converter module. The compensation unit is designed to provide a compensation variable for each DC-DC converter module. The compensation variables for the individual DC-DC converter modules are determined using the individual controlled variables for the respective DC-DC converter modules and prestored correction values. The individual DC-DC converter modules can be driven using a combination of the respective individual controlled variable and the corresponding compensation variable.

Furthermore, the following is provided:

A method for the closed-loop control of a DC-DC converter, in particular a DC-DC converter comprising a plurality of DC-DC converter modules. The method comprises a step for providing individual controlled variables. The individual controlled variables for the individual DC-DC converter modules are determined using a setpoint variable for the output voltage, a present value for the output voltage, a present value for the input voltage and a present value for the respective current in the corresponding DC-DC converter module. Furthermore, the method comprises a step for providing compensation variables. The compensation variables are determined using the individual controlled variable for the respective DC-DC converter module and a prestored correction value. In particular, a separate compensation variable can be determined for each DC-DC converter module. Finally, the method comprises a step for driving the DC-DC converter modules using a combination of the respective individual controlled variable for the corresponding DC-DC converter module and the corresponding compensation variable.

Advantages of the Invention

The present invention is based on the knowledge that, in the case of a DC-DC converter arrangement comprising a plurality of DC-DC converter modules connected in parallel, the currents output by the individual DC-DC converter modules and therefore the output powers can be different given the same driving owing to component part tolerances, ageing effects etc. As a result, the individual DC-DC converter modules can be subjected to different levels of loading.

Furthermore, it is also possible that, in the case of a DC-DC converter arrangement comprising a plurality of DC-DC converter modules, the individual DC-DC converter modules can be individually activated or deactivated during operation of the DC-DC converter arrangement. During connection or disconnection of a DC-DC converter module, the driving of the individual DC-DC converter modules needs to be adapted in each case in such a way that all of the DC-DC converter modules are subjected to as uniform a load as possible. In this case, when individual DC-DC converter modules are connected or disconnected, a short-term increase in the current may occur in one or more of the modules, which short-term increase in current can subject the corresponding DC-DC converter module to particularly severe loading or can possibly even damage it.

It is therefore one concept of the present invention to take account of this knowledge and to provide extended closed-loop control for a DC-DC converter arrangement comprising a plurality of DC-DC converter modules, in which, in a simple way and very quickly, a uniform current output of the individual DC-DC converter modules can be achieved. For this purpose, provision is made for an additional controlled variable to be generated in addition to existing closed-loop control for the individual DC-DC converter modules and for this additional controlled variable to be added to the normal controlled variable. In this case, the additional controlled variable can take into consideration the individual properties of the individual DC-DC converter modules, such as, for example, individual component part tolerances or the like. In this way, it is possible to achieve, even in the case of a plurality of DC-DC converter modules connected in parallel having slightly differing component part properties, driving of the individual DC-DC converter modules in which the individual DC-DC converter modules provide an identical output power and therefore an identical output current. In particular, unequal loading and an excessive current rise in one of the DC-DC converter modules can be reliably prevented.

For the determination of the additional controlled variable for the compensation of the individual component part properties of the individual DC-DC converter modules, the compensation values required for this can be predetermined and prestored. In this way, the required compensation values are directly available for the adaptation of the controlled variables.

The individual DC-DC converter modules can be driven in this way by combination of the normal, individual controlled variable of the individual DC-DC converter modules with a respectively corresponding further compensation variable. The compensation variable in this case takes into consideration the predetermined individual properties of the individual DC-DC converter modules. The compensation values for determining the respective compensation variables can be determined in advance during the operation of the DC-DC converter arrangement while the individual DC-DC converter modules are equated, i.e. are driven during operation in such a way that all of the DC-DC converter modules produce an identical output current. In particular, the individual compensation variables for each DC-DC converter module can be determined depending on the controlled variable provided by the closed-loop control. Furthermore, any other desired parameters, such as, for example, temperature, input voltage or output voltage, etc. can of course also be taken into consideration as well.

In particular, a relationship between the compensation value and the corresponding input voltage of the DC-DC converter module can be determined and stored for each DC-DC converter module. For this purpose, for example, in each case corresponding compensation values can be determined for a plurality of different input voltages. Furthermore, it is also possible, in principle, to determine a mathematical relationship between the compensation value and the input voltage or to determine compensation values by means of a computation method, for example interpolation or the like using two or more interpolation points.

In accordance with one embodiment, the control unit comprises a feedforward controller and a voltage regulator. Furthermore, the control unit can comprise an individual current regulator for each DC-DC converter module. The feedforward controller is designed to provide a first controlled variable using a present value for the input voltage. The voltage regulator is designed to provide a second controlled variable using a setpoint value for the output voltage and a present value for the output voltage of the DC-DC converter. The individual current regulators are designed to provide in each case a third controlled variable using an electrical current in the respective DC-DC converter module. The control unit can furthermore be designed to combine the first controlled variable, the second controlled variable and the third controlled variable of the respective DC-DC converter module to give individual controlled variables for the individual DC-DC converter modules. In this way, very reliable and at the same time efficient closed-loop control can be achieved for a DC-DC converter arrangement comprising a plurality of DC-DC converter modules.

In accordance with one embodiment, the compensation unit is designed to determine the compensation variable using the individual controlled variable for the respective DC-DC converter module. Furthermore, the compensation unit, for the determination of the compensation variable, can also take into consideration a present value for the input voltage and/or a present value for the temperature in the DC-DC converter modules as well. In particular, separate compensation values for the respective individual controlled variables, the values for the input voltage and the temperature can be prestored and taken into consideration for the determination of the compensation variable. Furthermore, if appropriate, further parameters or boundary conditions of the DC-DC converter arrangement can also be taken into consideration for the determination of the compensation variable. If appropriate, it is also possible for separate compensation values to be prestored for these further parameters.

In accordance with one embodiment, the prestored correction values specify an adaptation of the controlled variable depending on the input voltage of the DC-DC converter. For example, separate correction values can be stored and provided for a plurality of different values for the input voltage. In addition, the correction values can also be calculated, for example, by means of calculation, for example interpolation or the like, from two or more interpolation points given corresponding values for the input voltage. Furthermore, any other desired methods are of course also possible, for example the definition of a calculation specification or the like, for the determination of the correction values.

In accordance with one embodiment, the compensation unit is designed to determine correction values for the determination of the compensation variables of the DC-DC converter modules. The determined correction values can be stored, together with corresponding values for the input voltage, in a correction value memory. The determination and storage of the correction values can take place in advance, for example, during initialization or parameterization of the DC-DC converter.

Furthermore, correction values can also be determined and stored during operation of the DC-DC converter. In particular, for example, additional correction values can be determined and stored. Furthermore, it is also possible, if appropriate, for already existing correction values to be overwritten by newly determined correction values. In this way, for example, ageing effects or the like can be taken into account.

In accordance with one embodiment, the correction values are determined and stored when the DC-DC converter modules are actively driven so as to be equated, i.e. when the DC-DC converter modules are actively subjected to closed-loop control in such a way that identical currents are set in the individual DC-DC converter modules and therefore the DC-DC converter modules each provide an identical output power.

In accordance with one embodiment, the correction values are stored in a nonvolatile correction value memory.

The above configurations and developments can be combined with one another as desired, insofar as is sensible. Further configurations, developments and implementations of the invention also include combinations which have not been explicitly mentioned of features of the invention described above or below in relation to the exemplary embodiments. In particular, a person skilled in the art will in this case also add individual aspects as improvements or additions to the respective basic forms of the invention.

BRIEF DESCRIPTION OF THE DRAWINGS

Further features and advantages of the invention will be explained below with reference to the figures, in which.

DETAILED DESCRIPTION

Figure 1:
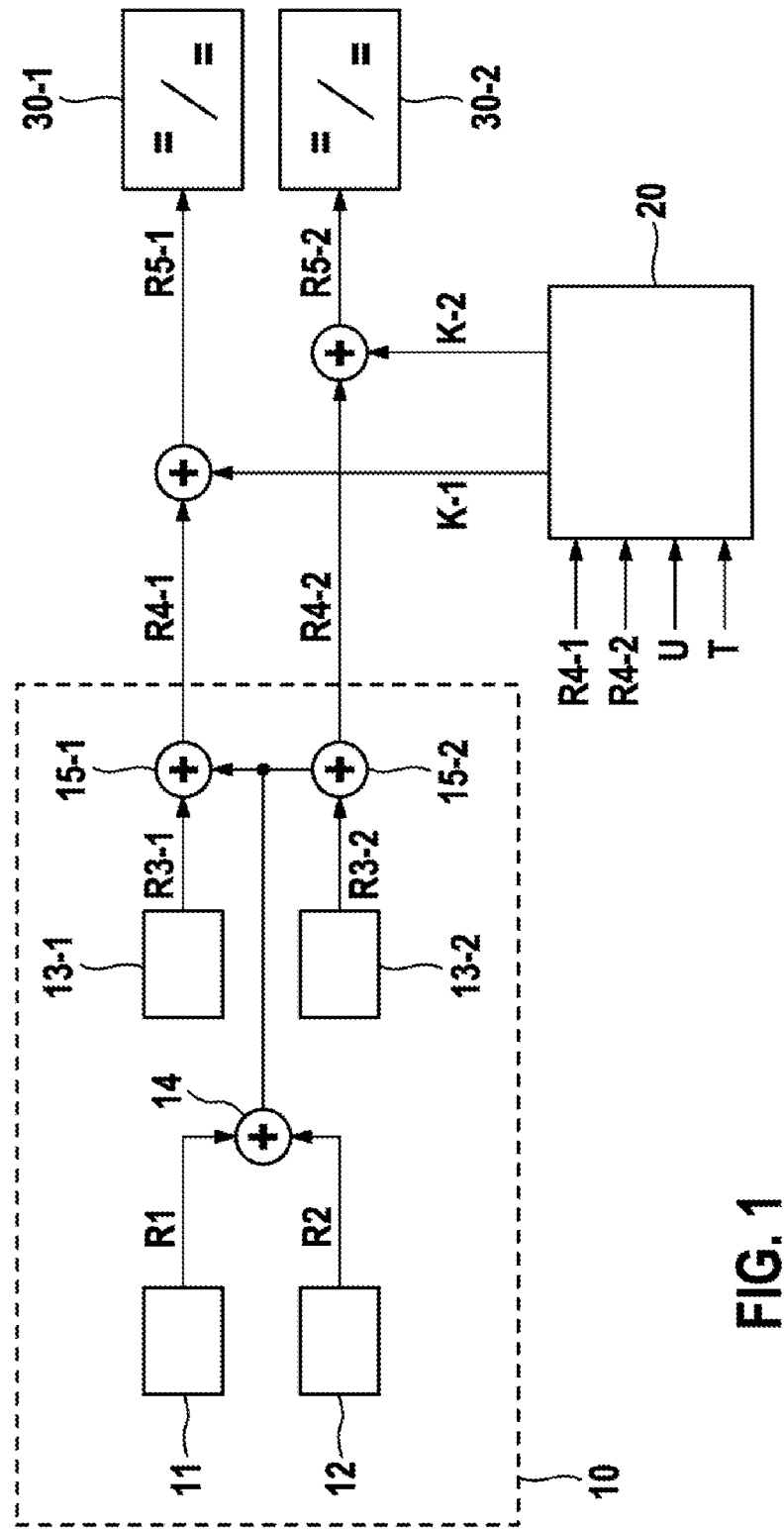
FIG. 1 shows a schematic illustration of a basic circuit diagram of a DC-DC converter comprising a control device in accordance with one embodiment.

FIG. 1 shows a schematic illustration of a DC-DC converter 1 comprising a plurality of DC-DC converter modules 30-$i$. The two DC-DC converter modules 30-1 and 30-2 illustrated here serve merely as an example for simple explanation of the basic principle according to the invention. It is of course also possible for the DC-DC converter 1 to have more than two DC-DC converter modules 30-$i$.

The individual DC-DC converter modules 30-$i$ are fed a common DC input voltage. Furthermore, the outputs of the individual DC-DC converter modules 30-$i$ can also be connected to one another, with the result that the individual DC-DC converter modules 30-$i$ also provide an identical output voltage. For the closed-loop control of the output voltage and the output current, the individual DC-DC converter modules 30-$i$ are each driven by a separate controlled variable R5-$i$. For example, this may be pulse-width-modulated closed-loop control, in which the duty factor of the controlled variables R5-$i$ is adapted correspondingly.

For the closed-loop control of the individual DC-DC converter modules 30-$i$, an individual controlled variable R4-$i$ can be generated for each DC-DC converter module 30-$i$. The generation of the individual controlled variables R4-$i$ in the control unit 10 will be explained in more detail below.

Furthermore, in addition a compensation variable K-$i$ is also generated for each DC-DC converter module 30-$i$.

Each DC-DC converter module 30-$i$ is driven by means of a combination of the respective individual controlled variable R4-$i$ and the corresponding compensation variable K-$i$. For this purpose, the individual controlled variable R4-$i$ and the corresponding compensation variable K-$i$ can be combined, for example, in a summator, and the combination of the individual controlled variable R4-$i$ and the compensation variable K-$i$ can be provided at the respective DC-DC converter module 30-$i$.

The determination of the compensation variables K-$i$ in this case in particular takes place using the respective individual controlled variables R4-$i$. Furthermore, a temperature T, in particular a temperature in the DC-DC converter modules 30-$i$, and/or a value for the input voltage U can also be used in the determination of the compensation variables K-$i$ as well. The determination of the compensation variables K-$i$ will be explained in more detail below.

For the determination of the individual controlled variables R4-$i$ in the control device 10, for example, a common feedforward controller 11, a common voltage regulator 12 and, for each DC-DC converter module 30-$i$, an individual current regulator 13-$i$ can be provided. The feedforward controller can determine a first controlled variable R1, for example, using a value for the input voltage and, if appropriate, further parameters. The voltage regulator 12 can, for example, compare the value for the output voltage of the DC-DC converter modules 30-$i$ with a preset setpoint value for the output voltage and generate a second controlled variable R2 using this comparison. This first controlled variable R1 and the second controlled variable R2 can be combined, for example, in a summator 14. Furthermore, the current regulators 13-$i$ corresponding to the respective DC-DC converter modules 30-$i$ can each generate a third controlled variable R3-$i$ using an electrical current in the respective DC-DC converter modules 30-$i$. These third controlled variables R3-$i$ can be combined with the combination of the first controlled variable R1 and the second controlled variable R2. For example, the summators 15-$i$ can be provided for this purpose. The combination of the first controlled variable R1, the second controlled variable R2 and the third controlled variables R3-$i$ for the individual DC-DC converter modules 30-$i$ thus gives the individual controlled variables R4-$i$. The latter can be combined, as previously already described, with the respective compensation variables K-$i$ in order to drive the corresponding DC-DC converter modules 30-$i$. In this way, a further compensation variable K-$i$ can be superimposed on the individual controlled variables R4-$i$. As a result, for example, individual component part tolerances in the individual DC-DC converter modules 30-$i$ can be taken into account.

Figure 2:
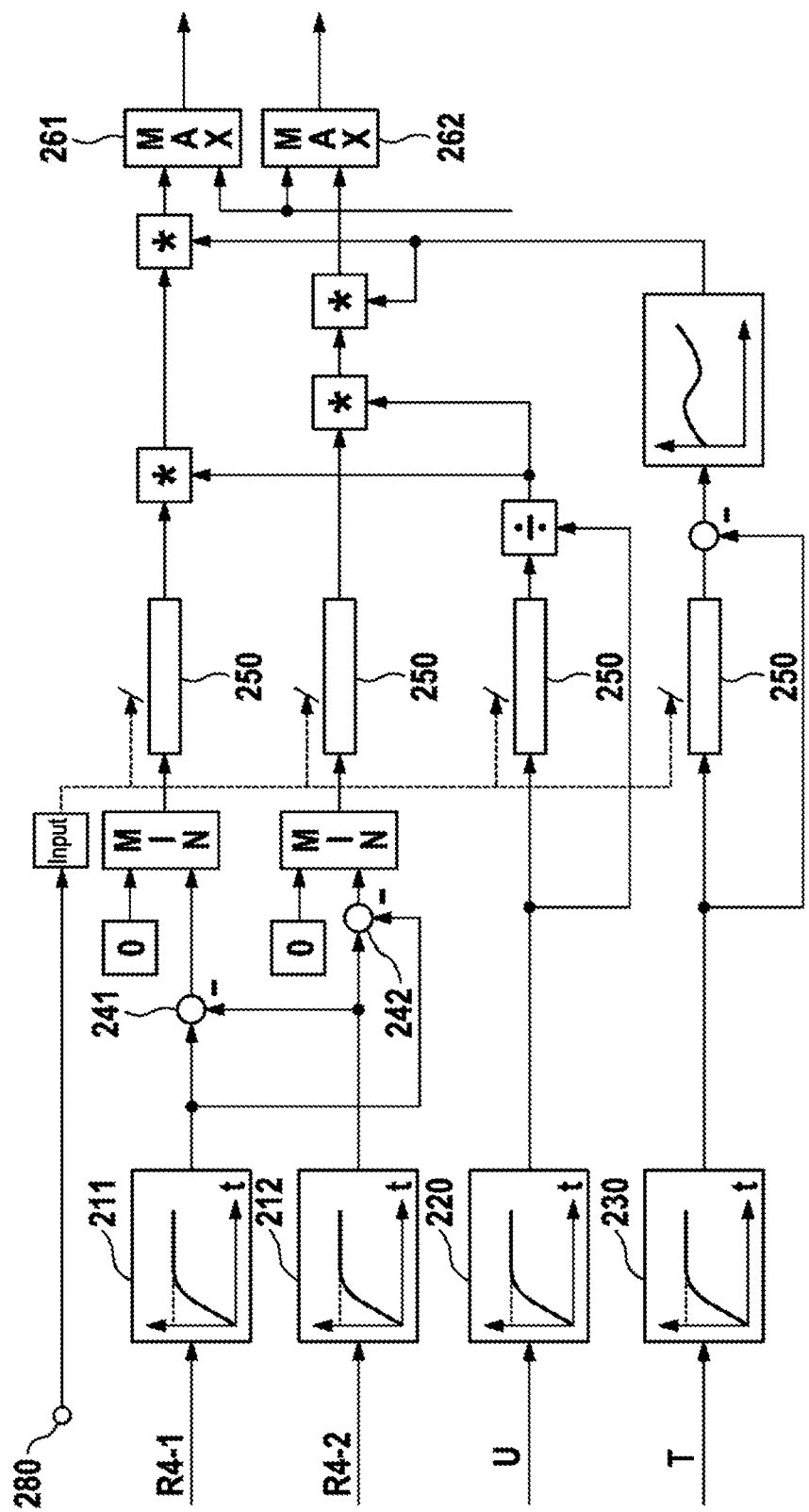
FIG. 2 shows a schematic illustration of a compensation unit for a DC-DC converter in accordance with one embodiment.

FIG. 2 shows a schematic illustration of a basic circuit diagram of a compensation unit 20 for a DC-DC converter 1 in accordance with one embodiment. For example, the above-described individual controlled variables R4-$i$, input voltage U and temperature T of the DC-DC converter modules 30-$i$ can be provided at the compensation unit 20. The provided values can be filtered, for example. For example, a first individual controlled variable R4-1 can be filtered by means of a first filter 211, a second individual controlled variable R4-2 can be filtered by means of a second filter 212. Likewise, the input voltage U can be filtered by means of a filter 220, and the temperature T can be filtered by means of a further filter 230.

Then, a difference between the individual controlled variables R4-$i$ can be formed by means of the differentiating elements 241 and 242. The differences can be limited thereafter to negative values. Then, a compensation variable is determined from the filtered values or the possibly limited difference in the individual controlled variables using previously stored correction values from the correction value memory 250. The compensation variables for the individual DC-DC converter modules 30-$i$ can be adapted further still, if appropriate, using compensation variables for the input voltage U and the temperature T. Finally, the compensation variables can be limited to a maximum value in the limitation units 261, 262. For example, a maximum correction of −2% or possibly −5% can be provided. The thus generated compensation variables K-$i$ can thereupon be combined with the individual controlled variables R4-$i$ and supplied to the respective DC-DC converter modules 30-$i$.

Furthermore, it is possible for it to be indicated at an input 280 that the DC-DC converter modules 30-$i$ have presently just been actively equated, i.e. the DC-DC converter modules 30-$i$ produce identical output currents or output powers. When the equalization is indicated at the input 280, the compensation unit 20 can detect the values present in this state such as controlled variables, voltages and temperature and store them in the correction value memory 250. In particular, the detected values, together with the respectively corresponding input voltage, can be detected at the DC-DC converter modules 30-$i$ and stored. The correction value memory 250 may be in particular a nonvolatile memory. In this way, it is possible to ensure that the detected correction values remain in the memory even after disconnection of the DC-DC converter.

Figure 3:
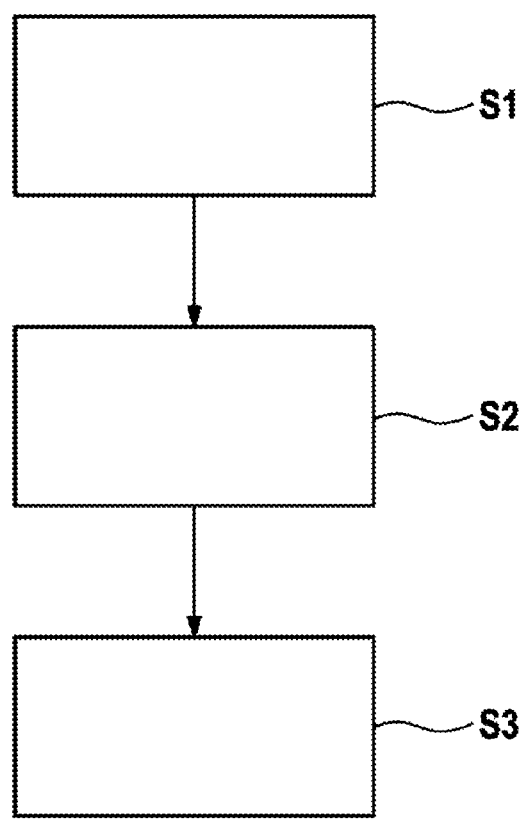
FIG. 3 shows a flowchart, as forms the basis of a method for the closed-loop control of a DC-DC converter in accordance with one embodiment.

FIG. 3 shows a schematic illustration of a flowchart of a method for the closed-loop control of a DC-DC converter 1 comprising a plurality of DC-DC converter modules 30-$i$. The method described below can in particular implement any desired steps as have already been described previously in connection with the operation of the DC-DC converter 1.

Correspondingly, the above-described DC-DC converter 1 can also implement all of the steps as are described below in connection with the method.

In step S1, an individual controlled variable R4-$i$ is provided for each DC-DC converter module 30-$i$. The individual controlled variable R4-$i$ can be determined and provided in particular using a setpoint variable for the output voltage, a measured value for the output voltage, a measured value for the input voltage and a measured value for the respective current of the DC-DC converter module 30-$i$.

In step S2, a compensation variable K-i is provided. The compensation variable is determined and provided in particular using the individual controlled variable R4-$i$ for the respective DC-DC converter module 30-$i$ and a prestored correction value. In step S3, thereupon the DC-DC converter modules 30-$i$ are driven using a combination of the respective individual controlled variable R4-$i$ and the corresponding compensation variable K-i.

In particular, the compensation variables K-i can be determined using the individual controlled variables R4-$i$, a value U for the input voltage of the DC-DC converter modules and a temperature T of the DC-DC converter modules. In particular, a correction value previously stored in a nonvolatile memory can be used for each input variable. The correction values in this case in particular represent a relationship between a correction value and a corresponding input voltage.

By way of summary, the present invention relates to extended adaptation of the controlled variables for a DC-DC converter comprising a plurality of DC-DC converter modules. For this purpose, in addition to the conventional closed-loop control of the individual DC-DC converter modules, a further compensation variable is determined, which can be added to the controlled variable. The compensation variable can in particular take into consideration individual properties of the DC-DC converter modules such as component part tolerances or the like. For this purpose, correction values which are suitable for the individual DC-DC converter modules can be determined in advance and stored in a nonvolatile memory. Using these prestored relationships, the controlled variables can be adapted individually for the individual DC-DC converter modules.

The invention claimed is:

1. A control device for a DC-DC converter (1) having a plurality of DC-DC converter modules (30-$i$), the control device comprising:
    a control unit (10) configured to provide, for each DC-DC converter module (30-$i$), an individual controlled variable (R4-$i$) using a setpoint variable for the output voltage, a measured value of an output voltage, a measured value of an input voltage and a measured value of respective current in each DC-DC converter module (30-$i$);
    a compensation unit (20) configured to provide, for each DC-DC converter module (30-$i$), a compensation variable (K-i) using the individual controlled variable (R4-$i$) for the respective DC-DC converter module (30-$i$) and a prestored correction value,
    wherein each DC-DC converter module (30-$i$) is driven using a combination of the respective individual controlled variable (R4-$i$) and the corresponding compensation variable (K-i).

2. The control device as claimed in claim 1, wherein the control unit (10) comprises a feedforward controller (11), a voltage regulator (12) and, for each DC-DC converter module (30-$i$), an individual current regulator (13-$i$), and wherein the feedforward controller (11) is configured to provide a first controlled variable (R1) using the measured value for the input voltage,
    the voltage regulator (12) is configured to provide a second controlled variable (R2) using the setpoint value for the output voltage and the measured value for the output voltage of the DC-DC converter,
    the current regulators (13-$i$) are configured to provide in each case a third controlled variable (R3-$i$) using an electrical current in the respective DC-DC converter module, and wherein the control unit (10) is configured to combine the first controlled variable (R1), the second controlled variable (R2) and the third controlled variable (R3-$i$) of the respective DC-DC converter module (30-$i$) to provide the individual controlled variables (R4-$i$) for the DC-DC converter modules (30-$i$).

3. The control device as claimed in claim 1, wherein the compensation unit (20) is configured to determine the compensation variable (K-i) using the individual controlled variable (R4-$i$) for the respective DC-DC converter module (30-$i$), the measured value (U) for the input voltage and a temperature (T) of the DC-DC converter modules (30-$i$).

4. The control device as claimed in claim 1, wherein the prestored correction value specifies an adaptation of the controlled variable depending on the input voltage.

5. The control device as claimed in claim 1, wherein the compensation unit (20) is configured to calculate the compensation variable using a plurality of stored correction values.

6. The control device as claimed in claim 1, wherein the compensation unit (20) is configured to determine correction values for the determination of the compensation variables of the DC-DC converter modules (30-$i$) and to store the determined correction values together with the corresponding input voltage in a correction value memory (250).

7. The control device as claimed in claim 6, wherein the compensation unit (20) is configured to determine and store the correction values when the DC-DC converter modules (30-$i$) are actively driven.

8. The control device as claimed in claim 6, wherein the correction value memory (250) comprises a nonvolatile memory.

9. A method for the closed-loop control of a DC-DC converter (1) having a plurality of DC-DC converter modules (30-$i$), the method comprising the following steps:
    providing (S1), via a control unit, an individual controlled variable (R4-$i$) using a setpoint variable of an output voltage, a measured value of an output voltage, a measured value of an input voltage and a measured value of respective current in each the DC-DC converter module (30-$i$);
    providing (S2) a compensation variable (K-i) using the individual controlled variable (R4-$i$) for the respective DC-DC converter module (30-$i$) and a prestored correction value; and
    driving (S3) the DC-DC converter modules (30-$i$) using a combination of the respective individual controlled variable (R4-$i$) and the corresponding compensation variable (K-i).

10. The method as claimed in claim 9, wherein providing the compensation variable (K-i) comprises a determination of the compensation variable (K-i) using the individual controlled variables (R4-$i$), a value (U) of the input voltage of the DC-DC converter modules (30-$i$) and a temperature (T) of the DC-DC converter modules (30-$i$).

* * * * *